Nov. 25, 1958  A. M. GUERREIRO  2,861,297
AUTOMATIC FORMING OF THERMO-PLASTIC MATERIALS
TO OPTICALLY TRUE CONTOURS
Filed July 25, 1955  3 Sheets-Sheet 1
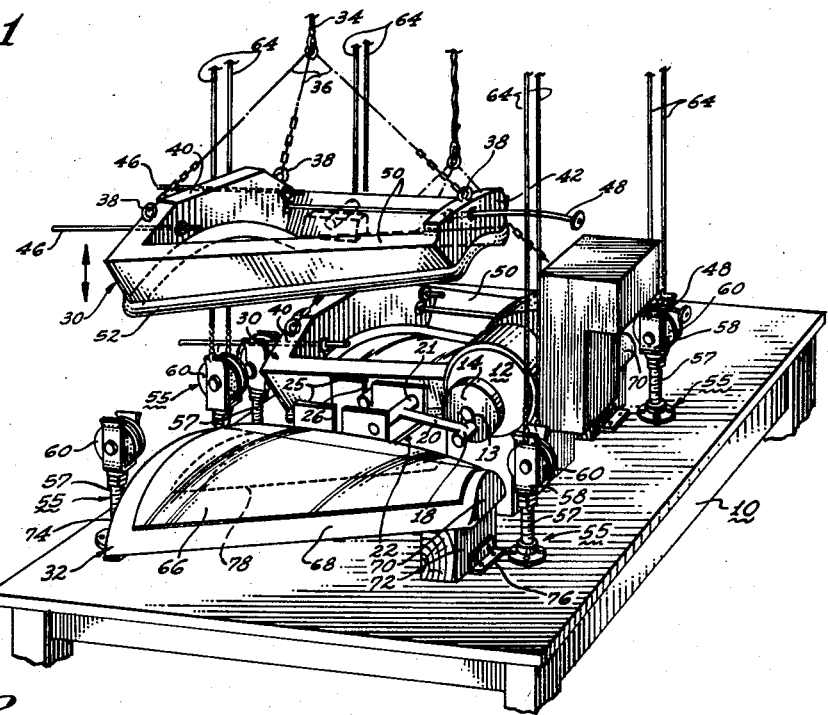
INVENTOR:
Antoné M. Guerreiro
BY Herbert E. Metcalf
His Patent Attorney

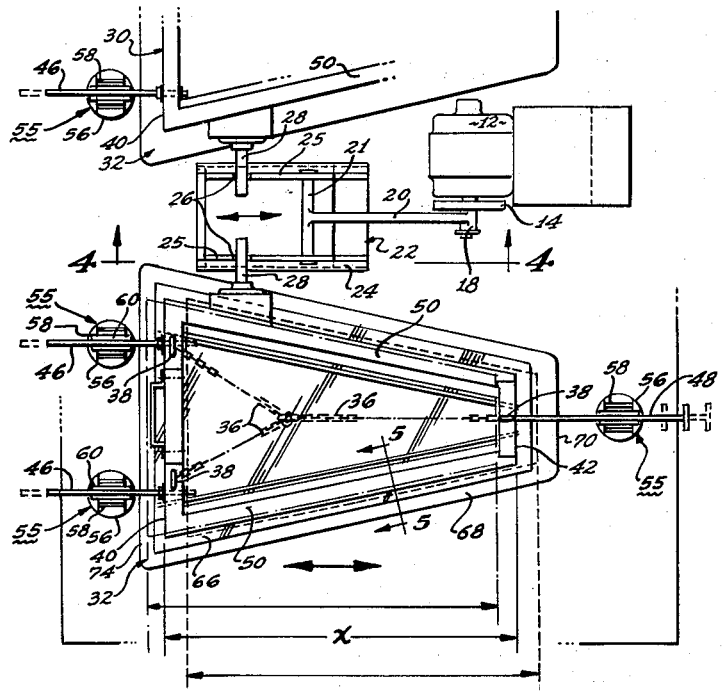
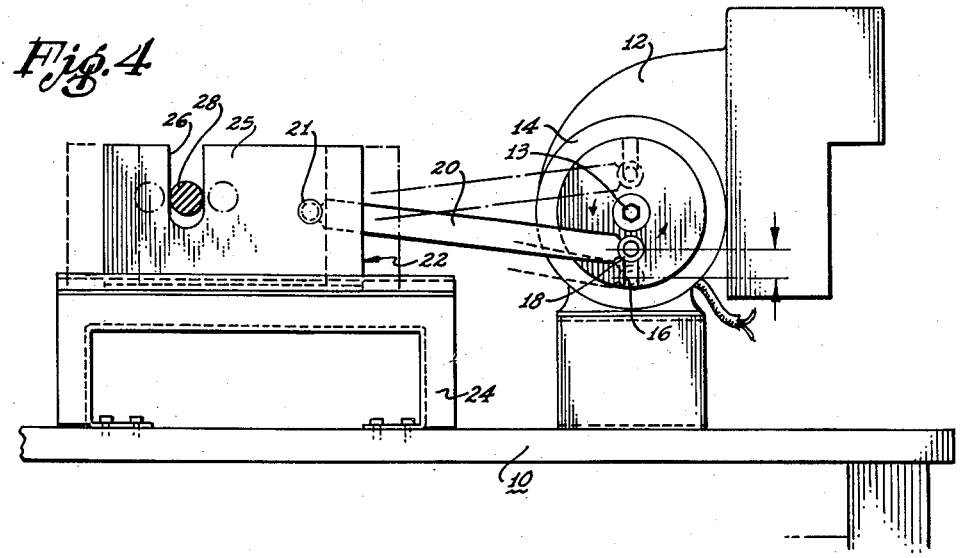

Nov. 25, 1958  A. M. GUERREIRO  2,861,297
AUTOMATIC FORMING OF THERMO-PLASTIC MATERIALS
TO OPTICALLY TRUE CONTOURS
Filed July 25, 1955  3 Sheets-Sheet 3
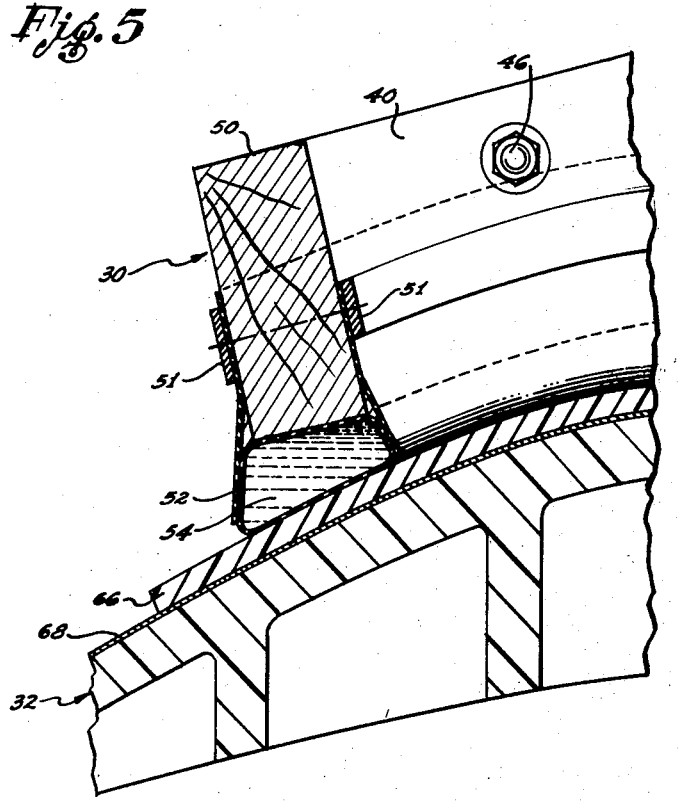
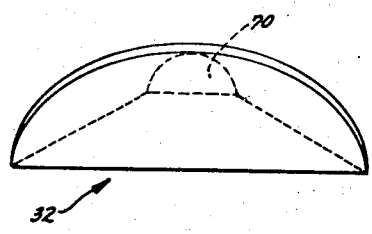
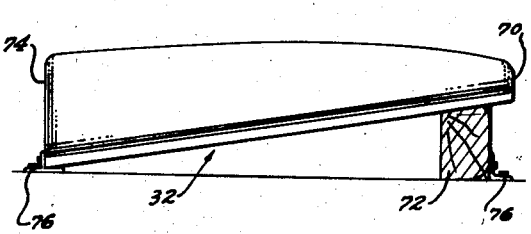
INVENTOR:
Antone' M. Guerreiro
By Hubert E. Metcalf
His Patent Attorneys United States Patent Office 2,861,297
Patented Nov. 25, 1958

2,861,297

AUTOMATIC FORMING OF THERMO-PLASTIC MATERIALS TO OPTICALLY TRUE CONTOURS

Antone M. Guerreiro, Long Beach, Calif., assignor to Northrop Aircraft, Inc., Hawthorne, Calif., a corporation of California Application July 25, 1955, Serial No. 524,136

3 Claims. (Cl. 18—19)

This invention has to do with the forming of materials into simple or compound curves.

The increased use of glass and clear plastics, such as many of the acylic resins, formed into simple and compound curves, has also made more acute the absence of ability to properly fabricate the materials to desired and demanded specifications. Probably one of the most frequently encountered objections relative to the fabricating of materials into simple or compound curves is that which occurs when the materials are used as windows in various vehicles. When the materials are molded into simple as well as compound contours there generally occurs in the curved areas and extending therefrom material distortion. As a result an individual looking through the distorted portion of a window views a distorted condition. The result of this is that accurate depth perception is destroyed. Also the one viewing the distortion and attempting to focus his eyes on an object could very possibly become ill due to the fact that the distortion would tend to give the illusion of movement to a stationary object.

Therefore, the principal object of this invention is to provide a device and method for forming transparent materials into simple or compound curves that are optically true.

Another object of this invention is to provide an automatic device and method for forming materials into simple or compound curves, in mass production methods, with the result that each piece of material formed to prescribed dimensions is substantially identical to another that is formed in the same manner, and each piece is optically true.

A further object of this invention is to provide a device and method for forming materials into simple or compound curves.

A yet further object of this invention is to provide a device for forming materials into simple or compound curves that is efficient, yet simple in construction, and suitable for mass production techniques.

Figure 1 is a fragmentary perspective view illustrating and having embodied therein the present invention, and showing one material molding member in an elevated position.

Figure 2 is a view similar to Figure 1 but illustrating the formerly elevated member in engaging relationship with the mold and material to be molded.

Figure 3 is a plan or overhead view illustrating and having embodied therein the present invention.

Figure 4 is a cross-sectional view taken on line 4—4 of Figure 3.

Figure 5 is a fragmentary, cross-sectional view taken on line 5—5 of Figure 3.

Figure 6 is an end elevation view of the mold upon which the material to be molded is placed.

Figure 7 is a side elevation view of the mold.

Referring to the drawings for a more detailed description of the present invention 10 designates a table, foundation or support. Mounted on the table is a variable speed motor 12 having a driving shaft 13. Secured to the driving shaft is a disc 14 having a radial slot 16 therein that provides an eccentric for an arm 18 that may be positioned within the slot in an infinite number of locations.

Integral with the arm is a T member 20, the short length 21 of which is pivotally mounted in a U-shaped slide 22 that is reciprocably supported upon a base 24.

Formed in each leg 25 of the slide is a slot 26 to receive a link or arm 28 on a hold down broadly designated 30.

As illustrated, there are a pair of opposed devices for forming materials. Each device on each side of the slide 22 is identical to the other. Therefore, only one will be described. However, that structure referred to in the one description is to be considered applicable to the other.

The hold down 30 is trapezoidal in configuration as may be determined by referring to Figure 3 of the drawings. It is raised and lowered onto the mold, broadly designated 32, by a cable 34 manually or automatically operated. The cable is connected to three lines 36 that in turn are secured to the hold down 30 by eye bolts 38.

Spanning the distance between the base 40 and apex 42 of the hold down 30 are reinforcing or supporting bars 44. Also extending in a direction opposed to bars 44 and on the base 40 are a pair of spaced apart guide rods 46. Further, extending outwardly from the apex 42, in a direction opposed to rods 46 is another rod 48. Either one or all of the rods 46 and 48 may be arcuately formed to present a curve similar to that illustrated for rod 48.

The two sides 50 of the hold down 30 are inclined toward each other as may be determined by referring to Figures 1 and 2 of the drawings. The base 40 and apex 42 are arcuately formed on that edge opposed to the eye bolts 38 to conform and be complementary in configuration to the mold 32.

Secured by fasteners, or other equally applicable means 51, to the edge of the hold down 30 nearest the mold 32 is a tube 52 filled with a liquid, generally water, 54. The tube 52 may be a flexible and resilient plastic material or some other suitable substance.

Each of the rods 46 and 48, when the hold down 30 is in the position illustrated in Figure 2 of the drawings, is received in supports broadly designated 55. Each of the supports is identical and comprises a base 56 secured to the table 10. Secured to the base is a bar 57 onto which is threaded a U-shaped bracket 58. Rotatably mounted within the bracket 58 is a roller 60 that receives and upon which the rods 46 and 48 rest.

Extending upwardly from each leg of certain brackets 58 is a guide cable 64 for the rods 46 and 48. The end of the cable not shown may be secured to any suitable overhead structure.

The mold 32 as illustrated is formed of a plastic material and has a compound curve formed therein. However, the curvature of the mold may just as readily be a simple curve. The mold face, upon which the material 66 to be molded is placed is covered with flannel 68.

The mold 32, like the hold down 30, is generally trapezoidal in configuration with the apex 70 held in an elevated position by a support 72. The support 72 as well as the base 74 is secured to the table 10 by brackets 76.

Attention is directed to Figure 1 of the drawings wherein it may be seen that there is a dotted line 78 on the mold 32. This dotted line is marked on the flannel cover 68 for the purposes of locating the material 66 on the mold 32 and for determining the amount of excess material that may be trimmed away.

The operation of the invention is as follows: Assume the hold down 30 to be in the position illustrated in Figure 1 of the drawings and the mold 32 not having any material 66 thereon. Further, assume, for purposes of illustration and not for purposes of limitation, that the material may be glass, metal or a plastic other than one of the acrylates.

The material 66 at normal room temperatures is rigid. Therefore, in order for it to be in a suitable condition for molding it must be placed in an oven and heated till it assumes a flexible, rubbery consistency. Once this condition is obtained, the material is removed from the oven and properly positioned on the mold 32 in the manner illustrated in Figure 1 of the drawings. Due to the fact that the material is flexible it will readily assume the configuration of the mold in one direction. However, if the mold is formed into a compound curve such as that illustrated in the various figures the material 66 tends to resist bending in one direction. This is a usual phenomena of virtually all flexible materials. Therefore, in order to insure the proper forming of the material 66 into a compound curve the hold down 30 is lowered onto the material in the manner illustrated in Figure 2 of the drawings. The liquid filled tube 52 engages the material outside of the dotted line 78 and forces the material 66 to the configuration of the mold 32.

When the hold down 30 is lowered onto the material 66 the arm 28 on the hold down is received in a slot 26 of the slide 22.

Further the rods 46 and 48 are received on the rollers 60 of the supports 55. In this condition the motor 12 is started and through the disc 14, arm 18, and T member 20 the slide 22 is caused to reciprocate back and forth which in turn results in reciprocating the hold down 30. Due to the fact that the material 66 is hot there is an increased friction between the material and the tube 52 which results in reciprocating the material 66 as well. It is essential that the material 66 be reciprocated for the reason that in the flexible condition in which it is in is prone to adopt the pattern of the flannel material 68 which would result in the material being pitted if permitted to cool without reciprocating. This action is continued until the material 66 is cool or cold and has again become rigid.

When the material 66 again becomes rigid the hold down 30 is elevated, the material 66 is removed from the mold 30 and eventually the excess is trimmed away. As a result there is obtained an optically true panel of material that will not cause a distortion of vision. This procedure may be duplicated any number of times and each time an optically true panel of material 66 is obtained that may be suitable for inserting as a window in a vehicle or other device.

The arm 18 may be located in any position in the slot 16 of the disc 14 to obtain the desired stroke of the slide 22. In some instances a long stroke may be desired; in other instances a short stroke may give the best results. The material to be molded will be a determining factor.

Further, the brackets 58 may be adjusted on the bar 56 of the support 55 to any elevation. The result of this adjustment will determine the amount of pressure that is exerted on the material 66 through the medium of the water filled tube 52, by the hold down 30. As a result of the tube being liquid filled it will transmit the pressure equally about the material and also not being a rigid structure will assume the configuration of the mold.

The rod 48 on the hold down 30 being arcuately bent will guide, through the medium of support 55, the hold down 30 through an arcuate path of travel similar to one angle of the mold 32.

Further instead of starting the motor 12 after the hold down 30 is in position it may be running with the slide 22 reciprocating. In other words one sheet of material 66 may be in the process of being formed on one mold when another sheet of material is placed on the other mold. As a result a continuous operation may be carried on without interruption.

It may be seen that very little skill is necessary in order to produce curved materials that are optically true.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A device for forming materials into simple and compound curves comprising a base; a mold on the base having the desired contour and upon which the material to be formed is placed; reciprocable means on and in frictional engagement with the material to urge the latter to the contour of the mold and to cause said material to reciprocate; elements on the means and base for guiding said means and material through the reciprocable path of travel; and structure on said means for equalizing the force applied to said material.

2. A device for forming materials into said simple and compound curves comprising a base; a mold on the base having the desired contour and upon which the material to be formed is placed; reciprocable means on and in frictional engagement with the material to urge the latter to the contour of the mold and to cause said material to reciprocate; elements on the means and base for guiding said means and material through the reciprocable path of travel; and structure on said means for equalizing the force applied to said material; said means being a hold-down.

3. A device for forming materials into simple and compound curves comprising a base; a mold on the base having the desired contour and upon which the material to be formed is placed; reciprocable means on and in frictional engagement with the material to urge the latter to the contour of the mold and to cause said material to reciprocate; and elements on the means and base for guiding said means and material through the reciprocable path of travel; said elements including equipment for varying the force urged against the material by the means.

References Cited in the file of this patent

UNITED STATES PATENTS

| | | |
|---|---|---|
| 2,332,926 | May et al. | Oct. 26, 1943 |
| 2,370,827 | Weichbrodt et al. | Mar. 6, 1945 |